(12) United States Patent
Toshima

(10) Patent No.: US 8,955,663 B2
(45) Date of Patent: Feb. 17, 2015

(54) MEDIA PROCESSING DEVICE, CHECK PROCESSING DEVICE, AND METHOD OF CONTROLLING A MEDIA PROCESSING DEVICE

(75) Inventor: Kazuya Toshima, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 13/553,177

(22) Filed: Jul. 19, 2012

(65) Prior Publication Data

US 2013/0020173 A1  Jan. 24, 2013

(30) Foreign Application Priority Data

Jul. 20, 2011  (JP) ................................. 2011-158663
Sep. 30, 2011  (JP) ................................. 2011-216111

(51) Int. Cl.
| | |
|---|---|
| *G07F 7/02* | (2006.01) |
| *G07F 7/10* | (2006.01) |
| *G07D 11/00* | (2006.01) |
| *G06Q 20/04* | (2012.01) |
| *G06K 13/16* | (2006.01) |
| *G07D 7/04* | (2006.01) |

(Continued)

(52) U.S. Cl.
CPC .......... *G07D 11/0051* (2013.01); *G06Q 20/042* (2013.01); *G06K 13/16* (2013.01); *G07D 7/04* (2013.01); *H04N 1/00339* (2013.01); *H04N 1/00689* (2013.01); *H04N 1/00694* (2013.01); *H04N 1/00705* (2013.01); *H04N 1/00713* (2013.01); *H04N 1/00734* (2013.01); *H04N 1/00745* (2013.01); *H04N 1/0075* (2013.01); *H04N 1/00774* (2013.01); *H04N 1/2034* (2013.01); *H04N 2201/0081* (2013.01)

USPC ........... 194/210; 194/205; 194/213; 209/547; 209/569; 209/583; 235/379; 235/440; 235/480; 382/137

(58) Field of Classification Search
USPC .......... 194/205-207, 210, 212, 213; 209/534, 209/547, 569, 583; 235/375, 379, 439, 440, 235/480; 382/137

See application file for complete search history.

(56) References Cited

U.S. PATENT DOCUMENTS

| | | | | |
|---|---|---|---|---|
| 5,754,673 A | * | 5/1998 | Brooks et al. | ................. 382/112 |
| 5,965,862 A | | 10/1999 | Momose | |
| 6,145,737 A | * | 11/2000 | Imai et al. | ..................... 232/1 D |

(Continued)

FOREIGN PATENT DOCUMENTS

| | | |
|---|---|---|
| EP | 1 918 854 A2 | 5/2008 |
| JP | 09-062798 A | 3/1997 |
| JP | 2002-255393 A | 9/2002 |

*Primary Examiner* — Jeffrey Shapiro
(74) *Attorney, Agent, or Firm* — Nutter McClennen & Fish LLP; John J. Penny, Jr.

(57) ABSTRACT

A compact media processing device enables recording on a process medium and then processing the process medium based on the result of recording. The media processing device conveys a process medium and processes the conveyed process medium by a first process unit disposed to the conveyance path, and an operation selection unit then determines the content of the next operation based on the result of the first process. After the next operation is determined, the conveyance control unit conveys the process medium upstream to or upstream of the process position of a second process unit. A process control unit then applies the selected operation to the process medium by the second process unit that is disposed downstream from the first process unit on the conveyance path of the process medium.

20 Claims, 9 Drawing Sheets

(51) Int. Cl.
*H04N 1/00* (2006.01)
*H04N 1/203* (2006.01)

(56) References Cited

U.S. PATENT DOCUMENTS

| | | | |
|---|---|---|---|
| 7,177,456 B2 * | 2/2007 | Maloney | 382/139 |
| 7,418,159 B1 * | 8/2008 | Bakker et al. | 382/306 |
| 7,555,156 B2 * | 6/2009 | Maloney | 382/139 |
| 7,866,666 B2 * | 1/2011 | Saikawa et al. | 271/265.04 |
| 7,900,907 B2 * | 3/2011 | Furihata et al. | 271/4.1 |
| 7,984,906 B2 * | 7/2011 | Yoneyama et al. | 271/265.02 |
| 8,020,771 B2 * | 9/2011 | Kinoshita et al. | 235/475 |
| 8,127,913 B2 * | 3/2012 | Hiroike et al. | 194/210 |
| 8,167,109 B2 * | 5/2012 | Furihata | 194/210 |
| 8,339,681 B2 * | 12/2012 | Nishimura et al. | 358/474 |
| 8,381,986 B2 * | 2/2013 | Kinoshita et al. | 235/475 |
| 2001/0021331 A1 * | 9/2001 | Brewington et al. | 400/188 |
| 2003/0075596 A1 * | 4/2003 | Koakutsu | 235/379 |
| 2005/0252960 A1 | 11/2005 | Murata | |
| 2007/0291328 A1 * | 12/2007 | Furihata et al. | 358/498 |
| 2009/0051109 A1 * | 2/2009 | Hiroike et al. | 271/265.01 |
| 2009/0091804 A1 * | 4/2009 | Nishimura et al. | 358/474 |
| 2009/0206152 A1 * | 8/2009 | Embury et al. | 235/375 |
| 2009/0283383 A1 * | 11/2009 | Kallin et al. | 194/345 |
| 2010/0158592 A1 | 6/2010 | Odagiri et al. | |
| 2013/0077120 A1 * | 3/2013 | Miyazawa | 358/1.13 |

\* cited by examiner

MEDIA PROCESSING DEVICE, CHECK PROCESSING DEVICE, AND METHOD OF CONTROLLING A MEDIA PROCESSING DEVICE

Priority is claimed under 35 U.S.C. §119 to Japanese Application nos. 2011-158663 filed on Jul. 20, 2011 and 2011-216111 filed on Sep. 30, 2011, which are hereby incorporated by reference in their entirety.

BACKGROUND

1. Technical Field

The present invention relates to a media processing device, a check processing device, and a method of controlling a media processing device.

2. Related Art

Devices that read information from a slip or other document to be read, and change the discharge destination of the document according to the result of reading the document, are known from the literature. See, for example, Japanese Unexamined Patent Appl. Pub. JP-A-H09-62798. The device described in JP-A-H09-62798 reads a barcode from a sheet medium, which is the document to be read, and determines that sheets that are read successfully are normal sheets, and sheets for which reading failed are defective sheets. A control gate is then operated to change the output destination of the sheet so that normal sheets and defective sheets are discharged into different discharge units.

Media processing devices that convey checks or other media and record images on the media while being conveyed are also known. See, for example, Japanese Unexamined Patent Appl. Pub. JP-A-2002-255393. This type of media processing device stores plural sheets of media in a loading unit, and continuously performs a process including conveying and recording on each of the plural media.

If a next process is applied to the process medium after a first process is completed, as described in JP-A-H09-62798, the next process cannot be performed if the process medium reaches the position of the next process before the first process ends. As a result, this device according to the related art requires a process medium conveyance path that is long to the position where processing occurs. When the next process applied to the medium changes according to the result of recording in the media processing device that conveys checks or other media and records images on the media while being conveyed, the conveyance path to the processing position must be sufficiently long, and reducing device size is difficult.

SUMMARY

The present invention is directed to solving the foregoing problem, and enables reducing the size of a media processing device that processes a process medium and then applies another process to the process medium based on the result of the first process.

One aspect of at least one embodiment of the invention is a media processing device including: a conveyance unit that conveys a process medium; a first process unit that is disposed to a conveyance path through which the process medium is conveyed and processes the process medium conveyed by the conveyance unit; a second process unit that is disposed downstream from the first process unit on the conveyance path through which the process medium is conveyed; a process control unit that causes the second process unit to process the process medium according to operating content determined according to the result of processing by the first process unit; and a conveyance control unit that conveys the process medium by the conveyance unit to the process position or before the process position of the second process unit after the operating content is determined according to the result of processing by the first process unit.

When the content of the next operation is determined based on the result of processing information recorded on the process medium and that operation is then performed, the invention enables performing the process (operation) at the normal process position because the process medium is conveyed upstream if, depending on the relationship between the length of the conveyance path and the locations of the process units, the process medium already reached the process position before the process starts. As a result, the device can be easily built compactly because limitations related to conveyance path length and the locations of process units can be alleviated.

In another aspect of at least one embodiment of the invention the second process unit is disposed to a position that the process medium reaches downstream from the process position of the second process unit when the first process unit has finished processing the process medium.

This enables further reducing device size.

In another aspect of at least one embodiment of the invention an operation selection unit that determines the operating content after processing by the first process unit based on the result of processing by the first process unit.

This aspect of the invention enables quickly determining the content of the next operation based on the result of the reading process applied to the process medium.

Another aspect of at least one embodiment of the invention also has a plurality of discharge units into which process media are discharged, the second process unit is configured as a switching unit that switches the discharge unit connected to the conveyance path of the process medium, and the process control unit operates the switching unit so that the process medium is discharged to one of the plural discharge units selected based on the result of processing by the first process unit.

This aspect of the invention enables selectively discharging the process medium by switching the discharge unit to which the process medium is discharged according to the result of the process.

Further preferably, the first process unit is a recording unit that records an image on the process medium.

Further alternatively, the first process unit is a reading unit that reads information recorded on the process medium.

Further alternatively, the first process unit is a reading unit that reads information magnetically recorded on the process medium.

Further alternatively, the first process unit has a plurality of reading units that read information recorded on the process medium; and the operating content is determined based on the reading results of the plural reading units.

Another aspect of at least one embodiment of the invention is a method of controlling a media processing device, including steps of: conveying a process medium and processing the conveyed process medium by a first process unit disposed in the conveyance path; determining the content of an operation after processing based on the result of processing by the first process unit; processing the process medium by a second process unit disposed downstream from the first process unit on the conveyance path of the process medium according to the content of the determined operation; and conveying the process medium upstream to the process position or before the process position of the second process unit after determining the operating content.

When the content of the next operation is determined based on the result of processing information recorded on the process medium and that operation is then performed, executing this control method enables performing the process (operation) at the normal process position because the process medium is conveyed upstream if, depending on the relationship between the length of the conveyance path and the locations of the process units, the process medium already reached the process position before the process starts. As a result, the device can be easily built compactly because limitations related to conveyance path length and the locations of process units can be alleviated.

This control method for a media processing device preferably also has steps of determining the discharge unit for discharging the process medium from among a plurality of discharge units based on the result of processing by the first process unit; and operating the second process unit so that the process medium is discharged into the selected discharge unit.

In another aspect of at least one embodiment of the invention, the process of the first process unit is reading information recorded on the process medium.

In another aspect of at least one embodiment of the invention, the process of the first process unit is reading information magnetically recorded on the process medium.

EFFECT OF THE INVENTION

The invention enables performing a second process determined according to the result of a first process from the normal process position irrespective of the length of the conveyance path and the locations of the process units. The media processing device and check processing device can therefore be built more compactly because limitations related to the conveyance path length and the relative positions of process units can be alleviated.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
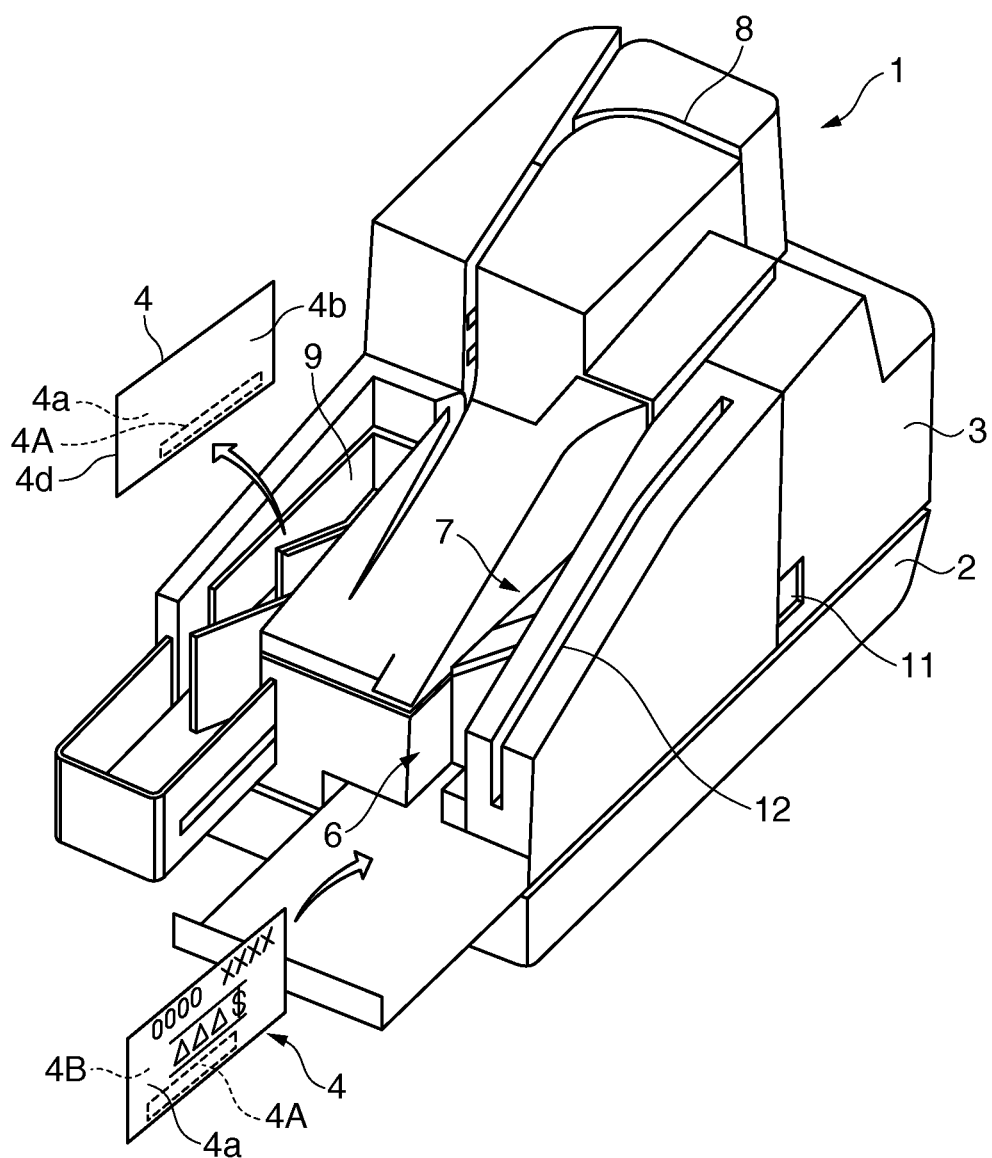
FIG. 1 is an external oblique view of a media processing device according to the invention.

FIG. 1 is an external oblique view of a media processing device 1 according to a preferred embodiment of the invention.

The media processing device 1 is a device that reads magnetic ink characters that are printed on a slip, check or other type of sheet medium to be processed, optically scans both sides of the medium, and records (prints) text or other content on the medium. The media processing device 1 also functions as a magnetic reader that reads information magnetically recorded on card media such as credit cards.

Figure 2:
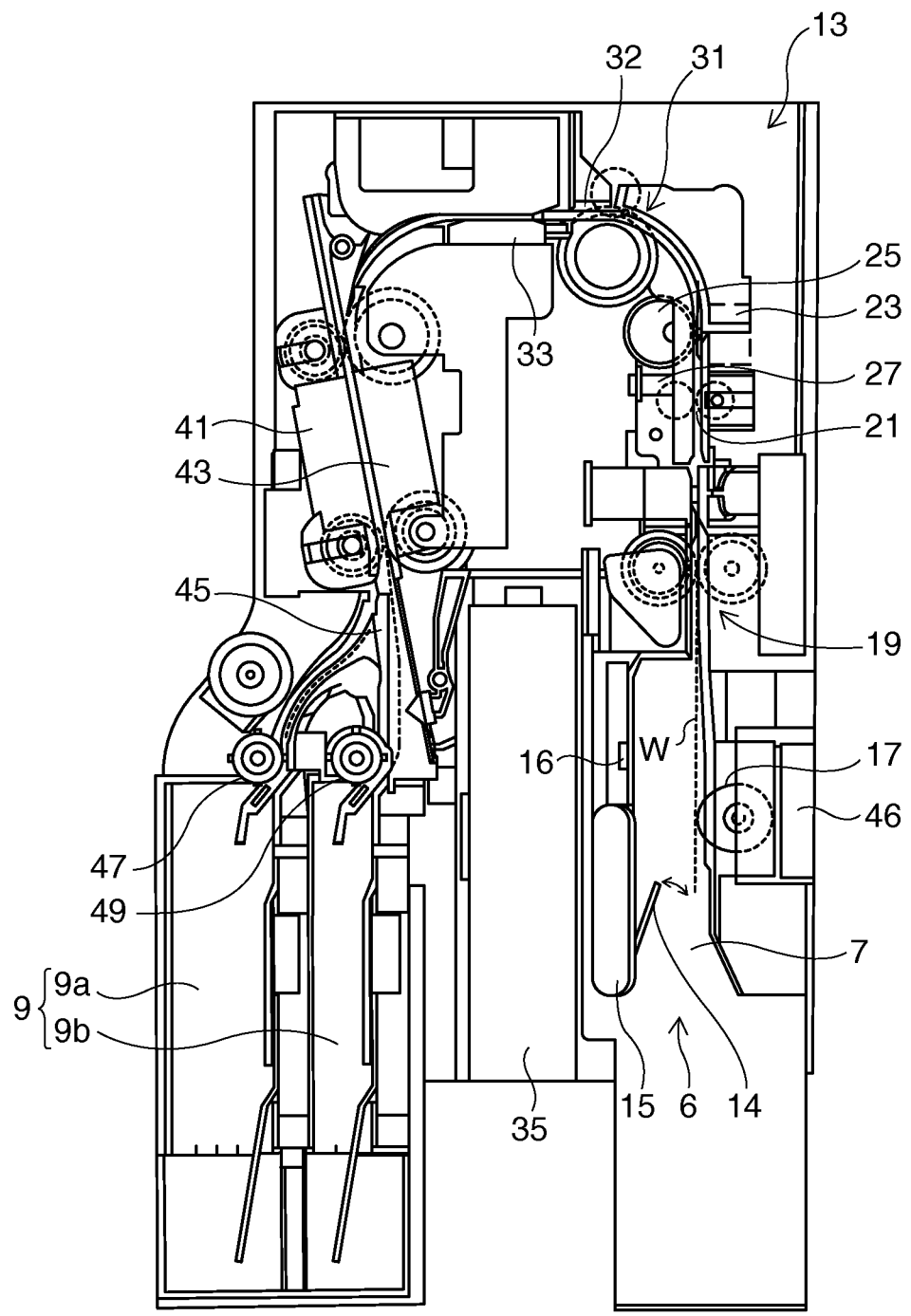
FIG. 2 is a plan view of the main unit of the media processing device.

This embodiment of the invention describes processing a check 4 as an example a medium to be processed (process medium). A check 4 is a type of form having a payment amount, serial number, and the name and signature of the payer printed or written on a paper slip. The amount, payer, serial number, and signature are recorded on the front 4a of the check 4. Space for endorsing the check 4 is provided on the back 4b. The media processing device 1 can print an endorsement in the endorsement space using a recording head 33 (FIG. 2). An MICR line 4A is also formed lengthwise along the check 4 on the front 4a of the check 4. The MICR line 4A is composed of plural magnetic ink characters (MICR characters) printed in magnetic ink, and information is magnetically recorded with these characters. The MICR line 4A can be read magnetically, and because the characters are written in a human-readable form, can also be read optically. The sizes of both the short and long sides of the check 4 are standard, the minimum size and maximum size that can be handled by the media processing device 1 are defined to include substantially all common check 4 sizes, and the media processing device 1 can process any check 4 in this range of sizes.

The media processing device 1 has an external housing including a bottom case 2 covering the bottom of the main unit, and a cover 3 that covers the bottom case 2. A media entrance 6 from which checks 4 are inserted opens to the front of the external housing, and the area extending toward the back of the housing from the media entrance 6 is a hopper 7 capable of holding plural checks 4. A slot 8 used as the check 4 conveyance path is formed substantially in a U-shaped configuration when seen from above, and this slot 8 continues to an exit pocket 9 disposed at the front of the media processing device 1.

The checks 4 stored in the hopper 7 are pulled one at a time into the media processing device 1 as described below, processed while travelling through the slot 8, and the processed checks 4 are discharged into the exit pocket 9. The exit pocket 9 can also hold a plurality of checks 4.

A lever 11 for opening the cover 3, and a slot 12 for swiping a credit card or other type card media, are also provided in the cover 3.

FIG. 2 is a plan view showing the configuration of the main unit 13 housed inside the outside housing of the media processing device 1. A flat pusher 14 is attached pivotably to one side of the hopper 7, and a pusher drive unit 15 causes the pusher 14 to pivot using the drive force of an actuator. When the pusher drive unit 15 causes the pusher 14 to rotate in the clockwise direction, the checks 4 stored in the hopper 7 are pressed to the other side of the hopper. A pickup roller 17 driven by an automatic sheet feeder (ASF) motor 62 (see FIG.

3) is disposed to the other side of the hopper 7. One of the plural checks 4 pushed to the pickup roller 17 side by the pusher 14 contacts the pickup roller 17, and is pulled into the conveyance path W by rotation of the pickup roller 17.

An ASF roller set 19 composed of a pair of rollers is disposed in the inside of the hopper 7. The two rollers in the ASF roller set 19 are disposed on opposite sides of the conveyance path W, one roller is driven by a conveyance motor 63 (see FIG. 3) described below, and the other roller is a follower roller. The check 4 that contacts the pickup roller 17 is nipped by the ASF roller set 19 and conveyed downstream in the conveyance path W.

An ASF paper detector 16 that has a transmissive sensor and detects the presence of a check 4 in the hopper 7 is disposed on the same side of the hopper 7 as the pusher 14.

The hopper 7, pusher 14, pusher drive unit 15, ASF paper detector 16, pickup roller 17, and ASF roller set 19 thus form an ASF unit that stores plural checks 4 and feeds them one at a time downstream.

A MICR (magnetic ink character recognition) head 23 that contacts the front 4a of the check 4 and magnetically reads the MICR line 4A (see FIG. 1) is disposed on the downstream side of the ASF roller set 19. An MICR roller 25 is disposed opposite the MICR head 23. The MICR roller 25 turns while pressing the check 4 against the MICR head 23, and conveys the check 4 at a speed suitable for reading MICR characters. A pair of assist rollers 21 that guide the check 4 fed by the ASF roller set 19 past the MICR head 23 is disposed on the upstream side of the MICR head 23.

A paper length detector 27 is disposed in the conveyance path W between the assist rollers 21 and MICR head 23. This paper length detector 27 is a reflective photosensor, for example, and detects the leading end and trailing end of the check 4 passing through the conveyance path W. The output from the paper length detector 27 is acquired by the control unit 50 described below, and the length of the check 4 is determined from the change in the detector output values.

A conveyance roller 31 including a pair of rollers in mutual opposition with the conveyance path W therebetween is disposed in the conveyance path W on the downstream side of the MICR head 23. The conveyance roller 31 conveys the check 4 to the recording position of the recording head 33.

The recording head 33 is an inkjet recording head that is located at the back of the main unit 13, receives ink supplied from an ink cartridge 35 stored at the front of the main unit 13, and ejects the ink onto the check 4. The recording head 33 prints text or an image as an endorsement on the back 4b of the check 4. The recording head 33 can be an inkjet line head, and when recording on a check 4 ejects ink from the stationary recording head 33 to record an image on the back 4b of the check 4 conveyed at a constant speed. The image recorded on the back 4b of the check 4 is an endorsement composed of text, symbols, or other markings. An intermediate detector 32 (sensor) is disposed on the upstream side of the recording head 33 between the recording head 33 and the conveyance roller 31. This intermediate detector 32 is a reflective photosensor, for example, and detects the presence of a check 4 at its detection position.

A CIS (contact image sensor) unit that optically reads the checks 4 is disposed downstream from the recording head 33. A front CIS unit 41 that scans the front 4a of the check 4, and a back CIS unit 43 that scans the back 4b, are disposed opposite each other with the conveyance path W therebetween. The media processing device 1 can thus read both sides of the check 4 using these two units. Conveyance rollers are disposed on the upstream and downstream sides of the front CIS unit 41 and back CIS unit 43, and the check 4 is thus conveyed stably while being scanned. The front CIS unit 41 and back CIS unit 43 are a reading unit and a first process unit, respectively, as described below.

Figure 3:
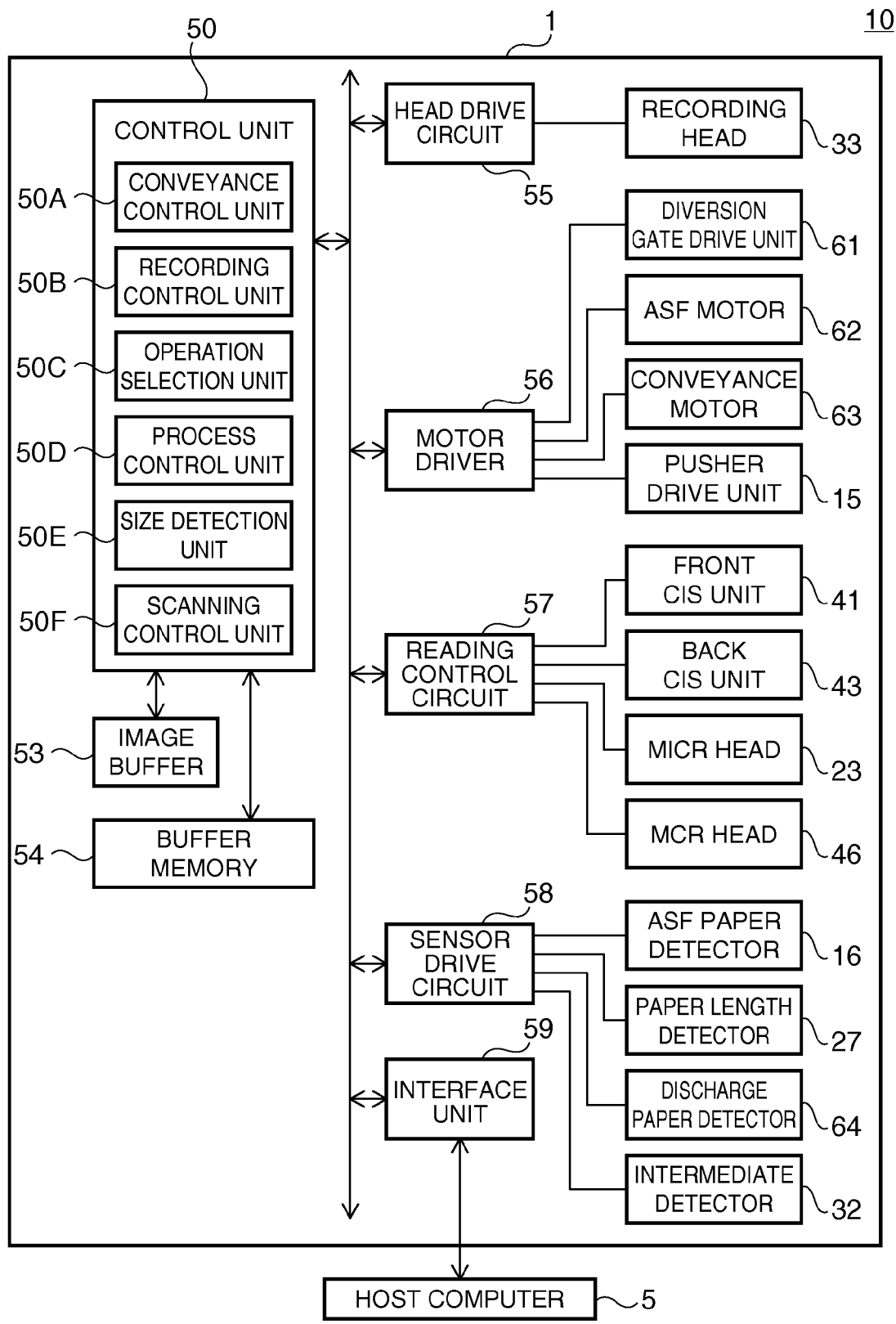
FIG. 3 is a function block diagram showing the configuration of a media processing system.

The above-described exit pocket 9 is disposed downstream from the front CIS unit 41 and back CIS unit 43. The exit pocket 9 is divided into a main pocket 9a (discharge unit) and a secondary pocket 9b (discharge unit), each of which can store a plurality of checks 4. Separate conveyance paths connect the main pocket 9a and secondary pocket 9b to the conveyance path W, and a diversion gate 45 is provided to switch between these paths. The diversion gate 45 is a guide that closes entry to the path connected to the main pocket 9a or the path connected to the secondary pocket 9b, thereby guiding the check 4 into the other path, and is driven by a diversion gate drive unit 61 (FIG. 3). A discharge roller 47 is disposed in the path from the diversion gate 45 to the main pocket 9a, another discharge roller 49 is disposed in the path from the diversion gate 45 to the secondary pocket 9b. Checks 4 guided by the diversion gate 45 are smoothly discharged into the exit pocket 9. The diversion gate 45 and diversion gate drive unit 61 together function as a second process unit and a switching unit.

The media processing device 1 discharges checks 4 on which an endorsement or other content was successfully recorded (printed) into the main pocket 9a, and discharges checks 4 on which recording failed to the secondary pocket 9b. Alternatively, the media processing device 1 could discharge checks 4 from which the MICR line 4A was successfully read or interpreted into the main pocket 9a, and checks 4 that could not be read or interpreted into the secondary pocket 9b. A discharge paper detector 64 (see FIG. 3) described below is disposed in both the main pocket 9a and the secondary pocket 9b. The discharge paper detector 64 can be a transmissive photosensor, for example, and detects the presence of checks 4 in the main pocket 9a and secondary pocket 9b.

An MCR (magnetic card reader) head 46 is disposed beside the hopper 7. The MCR head 46 is a magnetic head that reads information magnetically recorded on card media passing through the slot 12 (see FIG. 1).

FIG. 3 is a block diagram showing the functional configuration of a media processing system 10 (check processing system) composed of a media processing device 1 (check processing device) and host computer 5.

The media processing device 1 has a control unit 50 including a CPU that controls media processing device 1 operations, RAM, and flash ROM; a head drive circuit 55; a motor driver 56; a reading control circuit 57; a sensor drive circuit 58; and an interface unit 59; and these various parts are connected so that they can communicate with each other.

The control unit 50 controls other parts of the media processing device 1 by means of the CPU reading and running a control program stored in flash ROM. The control unit 50 has RAM as working memory for temporarily storing process data and the program executed by the CPU. The control unit 50 is connected to an image buffer 53 to which image data contained in the control commands for recording images is written. Buffer memory 54 for storing image data captured by the front CIS unit 41 and back CIS unit 43 is also connected to the control unit 50.

The head drive circuit 55 supplies drive current to the recording head 33 as controlled by the control unit 50, and prints on a check 4. The motor driver 56 is connected to the pusher drive unit 15, and operates the pusher drive unit 15 as controlled by the control unit 50. The motor driver 56 is connected to the diversion gate drive unit 61, ASF motor 62, and conveyance motor 63, outputs drive current and drive pulses to these motors, and operates the motors as controlled by the control unit 50.

The reading control circuit 57 is connected to the MICR head 23, front CIS unit 41, back CIS unit 43, and MCR head 46. The reading control circuit 57 drives the MCR head 46 to read magnetic information from the cards passing through the slot 12 (see FIG. 1) as controlled by the control unit 50, and digitizes and outputs the output signal from the MCR head 46 to the control unit 50.

The reading control circuit 57 likewise drives the MICR head 23 to read magnetic information as controlled by the control unit 50, and digitizes and outputs the output signal from the MICR head 23 to the control unit 50.

The reading control circuit 57 also outputs drive current to the front CIS unit 41 and back CIS unit 43 to scan the front 4a and back 4b of the check 4 as controlled by the control unit 50, and digitizes and outputs the output signals from the front CIS unit 41 and back CIS unit 43 to the control unit 50.

The sensor drive circuit 58 is connected to the ASF paper detector 16, paper length detector 27, intermediate detector 32, and discharge paper detector 64, supplies current to these detectors, samples the output values at a specific frequency, and digitizes and outputs the acquired output values to the control unit 50.

The interface unit 59 is connected by wire or wirelessly to the host computer 5, and exchanges data including control data with the host computer 5 as controlled by the control unit 50.

In the embodiment described above, the drive units of the pusher drive unit 15, ASF motor 62, and conveyance motor 63 together with the pusher 14, pickup roller 17, ASF roller set 19, MICR roller 25, conveyance roller 31, and discharge roller 47 form a conveyance unit.

The control unit 50 achieves the functions of the conveyance control unit 50A, recording control unit 50B, operation selection unit 50C, process control unit 50D, size detection unit 50E, and scanning control unit 50F by executing a control program.

The conveyance control unit 50A controls the pusher drive unit 15, ASF motor 62, and conveyance motor 63 through the motor driver 56, and controls check 4 conveyance. For example, while checks 4 are being processed by the media processing device 1, the conveyance control unit 50A determines whether or not to start conveying the next check 4 stored in the hopper 7 (FIG. 1), and if the next check 4 can be processed, operates the pusher drive unit 15 and ASF motor 62 to pick and feed the next check 4 into the conveyance path W.

In addition, if a check 4 has already reached the position of the diversion gate 45 when the process control unit 50D controls the diversion gate drive unit 61 to move the diversion gate 45, the conveyance control unit 50A reverses the conveyance motor 63 and conveys the check 4 in the opposite (upstream) direction. Because this moves the check 4 to or upstream of the position of the diversion gate 45, the check 4 can be discharged into the specified side, either the main pocket 9a or the secondary pocket 9b, by moving the diversion gate 45 appropriately.

Printing Process

Figure 4A:
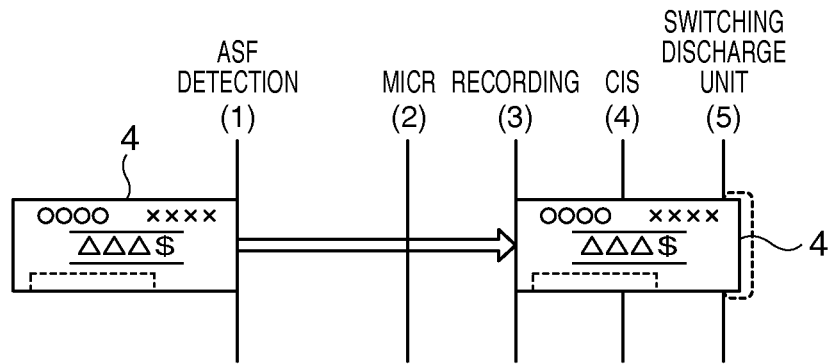
FIG. 4A schematically describes conveyance of a check in a preferred embodiment of a printing process according to the invention.
Figure 4B:
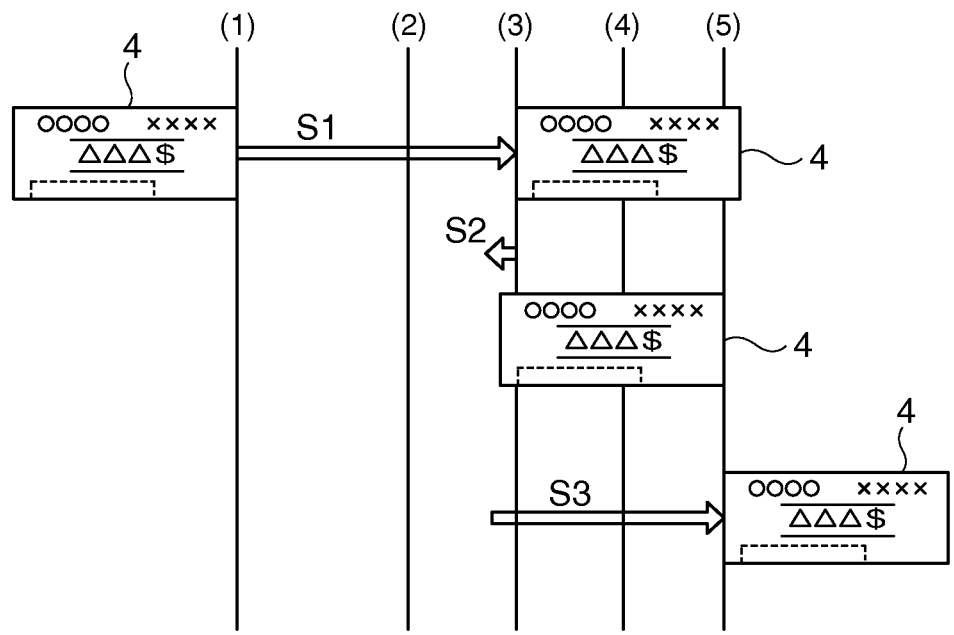
FIG. 4B schematically describes conveyance of a check in a preferred embodiment of a printing process according to the invention.

FIG. 4A and FIG. 4B schematically describe conveyance of a check 4, FIG. 4A showing when recording on a check 4 is completed, and FIG. 4B showing the change in conveyance until the check 4 is discharged.

The horizontal axis shows the position on the conveyance path W in FIG. 4A and FIG. 4B. Positions (1) to (5) in the figures indicate specific process positions along the conveyance path W. More specifically, position (1) is the position where the ASF paper detector 16 detects a check 4; position (2) is the reading position where the MICR head 23 reads magnetically; position (3) is the recording position where the recording head 33 ejects ink and records; position (4) is the scanning position where the front CIS unit 41 and back CIS unit 43 read optically; and position (5) is the switching position of the diversion gate 45.

A check 4 is first detected by the ASF paper detector 16, and then fed into the conveyance path W by the pickup roller 17. The check 4 is then conveyed past positions (2) to (4) by the drive power of the conveyance motor 63, and is guided into the main pocket 9a or secondary pocket 9b by the diversion gate 45 at position (5). However, if the distance between process positions on the conveyance path W is shorter than the length of the check 4 in the conveyance direction, the check 4 will reach the process position on the downstream side while in the middle of an upstream process. If the upstream process is a recording process of the recording head 33, the check 4 will be past position (5) when the recording operation of the recording head 33 ends as shown in FIG. 4A. In FIG. 4A, when the trailing end of the check 4 in the conveyance direction is at position (3), the leading end of the check 4 (the part enclosed in a dotted line in the FIG. 4) is already past position (5). In this situation the discharge path of the check 4 cannot be changed even if the diversion gate 45 is moved.

The distance between position (3), which is the recording process position, and position (5), which is the process position for changing the pocket into which the check is discharged, is the problem in the example shown in FIG. 4A, but the same problem can occur at other process positions. For example, when optical scanning of the check 4 is completed, the trailing end of the check 4 is at position (4) but the leading end of the check 4 is already at position (5). As a result, even if the check 4 is to be output to the main pocket 9a or the secondary pocket 9b based on the result of optical scanning, the diversion gate 45 at position (5) can already not be switched.

This embodiment of the invention therefore enables processing checks 4 in a specific order even if the distance between process positions is short by temporarily conveying the check 4 in reverse (back-feeding) as controlled by the conveyance control unit 50A.

As shown in FIG. 4B, the conveyance control unit 50A conveys the check 4 forward (downstream) until recording to the check 4 is completed (S1). The conveyance control unit 50A then back-feeds the check 4 temporarily so that the check 4 discharge path can be changed by the diversion gate 45 (S2). The conveyance control unit 50A back-feeds the check 4 at least until the leading end of the check 4 is at position (5) or is upstream of position (5). After the diversion gate 45 is moved by the process control unit 50D, the conveyance control unit 50A conveys the check 4 forward, that is, to the exit pocket 9 (S3). As a result, the pocket into which the check 4 is discharged can be changed by the diversion gate 45 after the recording process ends at position (3).

The distance that the conveyance control unit 50A back-feeds the check 4 is determined from the size of the check 4 that can be processed by the media processing device 1 (the length in the conveyance direction), and the distance between the process positions on the conveyance path W. This back-feed distance is, for example, a specific amount that is preset and is stored in nonvolatile memory (not shown in the figure) of the control unit 50. In this case, the back-feed distance is set referenced to the maximum size of a check 4 that can be used in the media processing device 1, and is set to the distance the leading end of the check 4 travels to reach the process position or the upstream side of the process position when a check 4 of the maximum size is used and back-fed. More specifically, the back-feed distance is determined from the maximum size (length) of the checks 4, and the distance between position (3) and position (5).

Based on whether or not the recording control unit 50B succeeded in recording to the check 4, the operation selection unit 50C determines the content of the operation to be performed on the check 4. More specifically, if the recording control unit 50B succeeds in recording on the check 4, the operation selection unit 50C selects discharging into the main pocket 9a as the content of the operation on the check 4. If the recording control unit 50B fails in recording on the check 4, the operation selection unit 50C selects discharging into the secondary pocket 9b as the content of the operation on the check 4.

The process control unit 50D controls executing the content of the operation on the check 4 selected by the operation selection unit 50C. More specifically, the process control unit 50D drives the diversion gate drive unit 61 to move the diversion gate 45 to connect the pocket on the selected side to the conveyance path W.

The size detection unit 50E receives the output value of the paper length detector 27 from the sensor drive circuit 58, and detects the size of the check 4 in the long direction, that is, the conveyance direction, based on the conveyance amount of the conveyance motor 63 between when the paper length detector 27 detects the leading end and detects the trailing end of the check 4.

Figure 5:
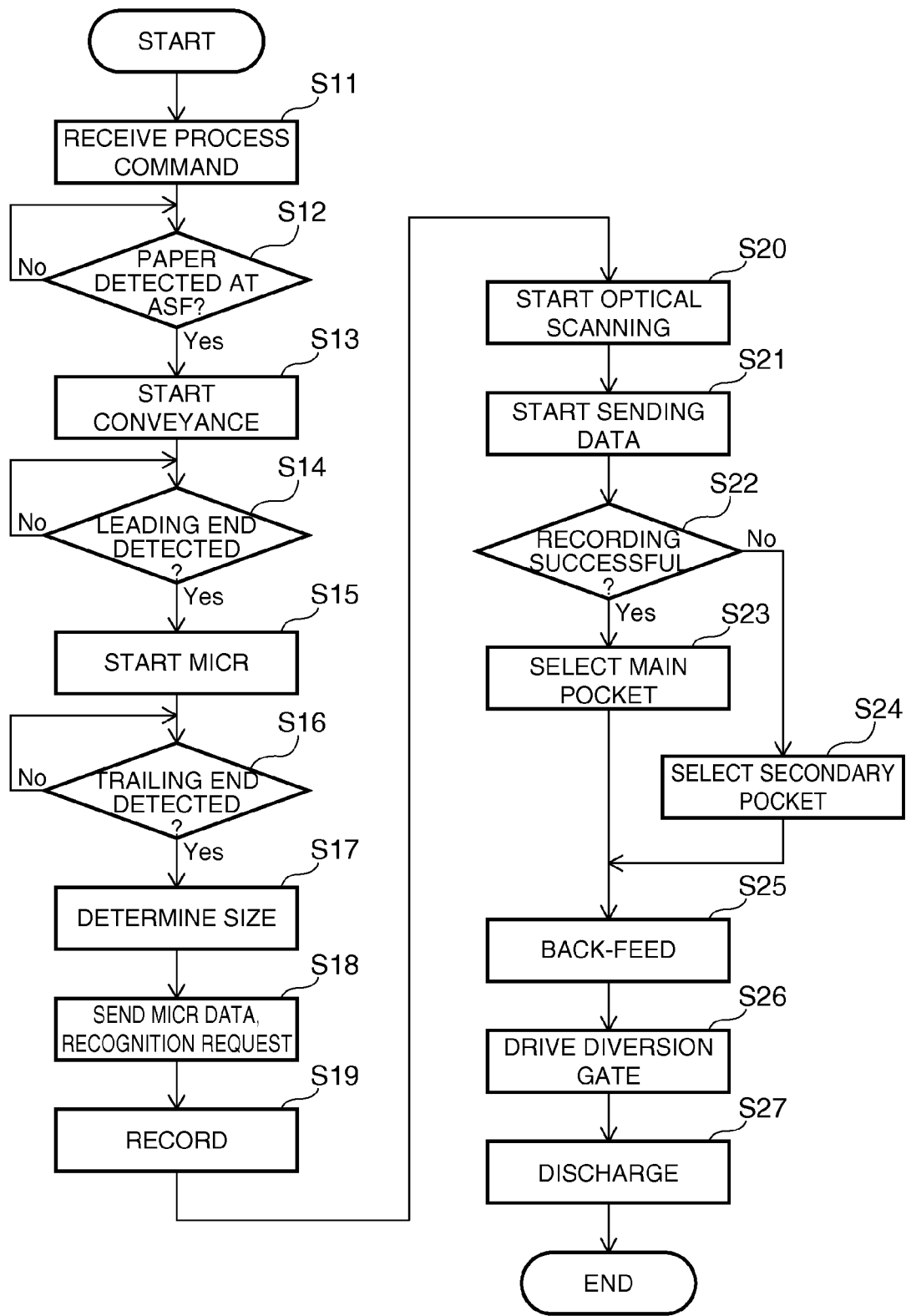
FIG. 5 is a flow chart of the operation of the media processing device in a preferred embodiment of a printing process according to the invention.

FIG. 5 is a flow chart of the operation of the media processing device 1.

The control unit 50 receives a command sent from the host computer 5 to start processing a check 4 (step S11), and starts the check 4 process. The control unit 50 then determines based on the output from the ASF paper detector 16 if a check 4 is in the hopper 7 (step S12), and if a check 4 is not present (step S12 returns No), waits until a check 4 is loaded. If a check 4 is in the hopper 7 (step S12 returns Yes), the conveyance control unit 50A operates the pusher drive unit 15 and ASF motor 62, and starts supplying (conveying) a check 4 from the hopper 7 (step S13). The conveyance control unit 50A conveys the check 4 to the paper length detector 27 by the ASF roller set 19 and assist rollers 21 (step S14), and when the leading end of the check 4 is detected (step S14 returns Yes), the size detection unit 50E starts detecting the size and the control unit 50 starts reading the MICR line with the MICR head 23 (step S15).

The size detection unit 50E waits until the trailing end of the check 4 is detected by the paper length detector 27 (step S16), and when the trailing end of the check 4 is detected (step S16 returns Yes), determines the size of the check 4 (step S17).

The control unit 50 then captures and sends the output from the MICR head 23 through the interface unit 59 to the host computer 5, and causes the host computer 5 to interpret the MICR text (step S18). The recording control unit 50B then causes the recording head 33 to record on the check 4 (step S19).

The control unit 50 then starts scanning with the front CIS unit 41 and back CIS unit 43 (step S20), and starts sending the captured image data to the host computer 5 (step S21).

The control unit 50 then recognizes if recording to the check 4 by the recording head 33 was successful (step S22). If recording to the check 4 succeeded (step S22 returns Yes), the operation selection unit 50C sets the discharge destination of the check 4 to the main pocket 9a (step S23). More specifically, the content of the operation on the check 4 is determined to be conveyance to the main pocket 9a. If recording to the check 4 failed (step S22 returns No), the operation selection unit 50C sets the discharge destination of the check 4 to the secondary pocket 9b (step S24). More specifically, the content of the operation on the check 4 is determined to be conveyance to the secondary pocket 9b.

The process control unit 50D then back-feeds the check 4 with the conveyance control unit 50A in order to move the diversion gate 45 according to the operation selected in step S23 or S24 (step S25). Next, the process control unit 50D moves the diversion gate 45 as determined in step S23 or S24 (step S26), and the conveyance control unit 50A conveys the check 4 to the exit pocket 9. As a result, the check 4 is discharged into the main pocket 9a if recording to the check 4 succeeded, and is discharged into the secondary pocket 9b if recording to the check 4 failed.

As a result, when recording to the check 4 succeeds, the check 4 is discharged into the main pocket 9a as a normal check 4, and when recording to the check 4 fails, is discharged into the secondary pocket 9b as a check 4 that was not processed normally. In other words, a check 4 is discharged selectively to the main pocket 9a or secondary pocket 9b based on the result of recording to the check 4.

As described above, a media processing device 1 according to this embodiment of the invention, and a media processing system 10 using the media processing device 1, have a conveyance unit that conveys a check 4 and includes a pusher drive unit 15, ASF motor 62, conveyance motor 63, pickup roller 17, ASF roller set 19, MICR roller 25, conveyance roller 31, and discharge roller 47; a recording head 33 as a first process unit that is disposed in the check 4 conveyance path W and records on the conveyed check 4; a diversion gate 45 as a second process unit disposed in the conveyance path W downstream from the recording head 33; a process control unit 50D that processes the check 4 with the diversion gate 45 according to the content of the operation determined by a operation selection unit 50C based on the result of recording by the recording head 33; and a conveyance control unit 50A that conveys the check 4 upstream to the process position or the upstream side of the process position of the diversion gate 45 after the content of the operation is determined. When the operation to be performed next is determined according to the result of recording on the check 4 and that process is executed, the process can be executed from the normal processing position even if the check 4 had already reached the printing position before the process starts due to the relationship between the length of the conveyance path W and the process positions of each unit by temporarily conveying the check 4 upstream. The media processing device 1 can therefore be built compactly because limitations related to the length of the conveyance path and the relative positions of different process unit can be alleviated.

The first process unit and second process unit of the media processing device 1 are also not limited to the recording head 33 and diversion gate 45. For example, the MICR head 23 could be used as the first process unit, and the operation of the diversion gate 45 used as the second process unit could be determined based on the result of reading by the MICR head 23, or the front CIS unit 41 and back CIS unit 43 could be used as the second process unit, and the content of their scanning processes could be determined based on the result of processing by the first process unit. Other process units could also be disposed in the conveyance path W, and these process units could be used as the first or second process unit.

Recording Operation and Correctness

Recording on a check 4 by the recording head 33 is described in detail next.

To record an image on a check 4, a control command instructing the recording of a specific image on the check 4 is first input from the host computer 5 to the media processing device 1. The image data (bitmap data or other data containing information related to the color of each pixel) for the image to be recorded on the check 4 is included in this control command.

When the control command is input, the recording control unit 50B writes the image data contained in the control command to the image buffer 53, and then records the image as described below based on the buffered image data.

Figure 6:
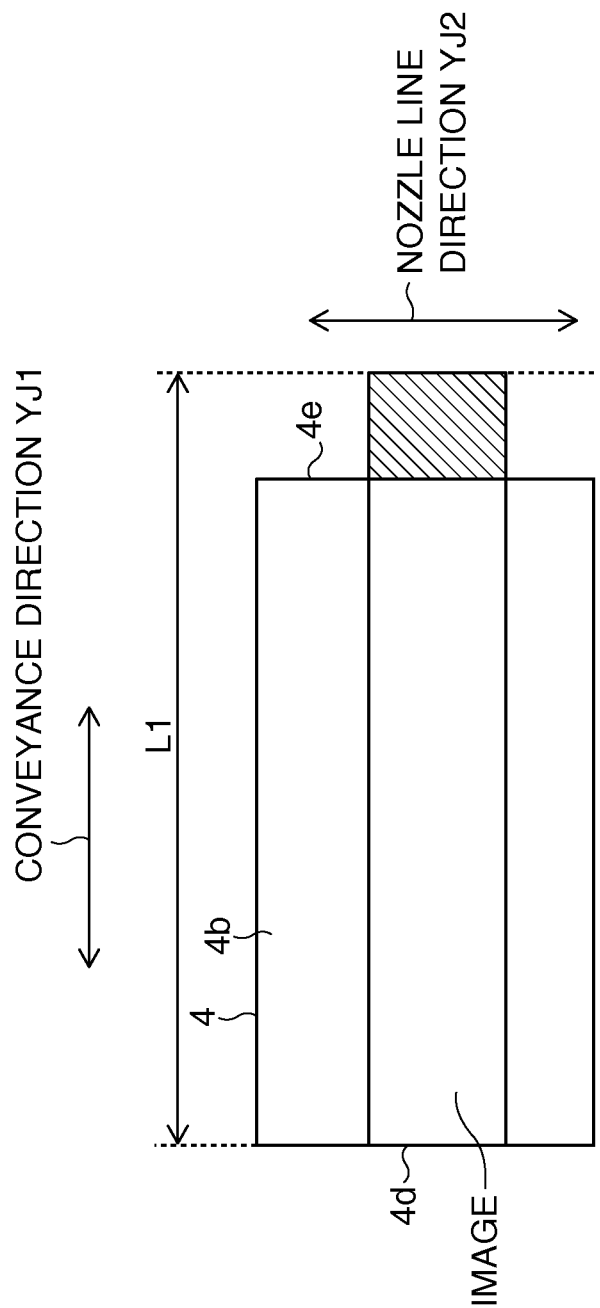
FIG. 6 shows an example of a check used to describe recording an image on a check.

FIG. 6 describes operation when recording an image on a check 4, and schematically shows the back 4b of the check 4 (the surface of the side to which the image is recorded).

The edge on the left side of the check 4 shown in FIG. 6 is the leading end 4d, the end on the right side is the trailing end 4e, and the check 4 is conveyed through the conveyance path W in conveyance direction YJ1 (the direction from the hopper 7 to the exit pocket 9 through the conveyance path W).

The recording head 33 has one or a plurality of nozzle lines formed with a plurality of nozzles extending in a nozzle line direction YJ2 (i.e., the direction of the short side of the conveyed check 4) that is perpendicular to the conveyance direction YJ1.

To record an image, the conveyance control unit 50A drives the conveyance motor 63 and other parts, and conveys the check 4 at a constant speed in the conveyance direction YJ1 in FIG. 6. The recording control unit 50B then records an image from a combination of dots on the back 4b of the check 4 by ejecting a specific amount of ink from specific nozzles of the nozzle line at a specific timing onto the check 4 conveyed in the conveyance direction YJ1 based on the image data stored in the image buffer 53.

When recording an image on the check 4 in this example, the length in the conveyance direction YJ1 (image length L1 below) of the image represented by the image data input from the host computer 5 to the media processing device 1 for recording on the check 4 is normally shorter than the length of the check 4 in the conveyance direction YJ1. However, image data with an image length L1 that is greater than the length of the check 4 in the conveyance direction YJ1 could be input from the host computer 5 to the media processing device 1, or a check 4 that is shorter than the image length L1 could be conveyed. In this case, the media processing device 1 records the image based on the control command input from the host computer 5 by ejecting ink from the nozzle line of the recording head 33 while conveying the check 4 in the conveyance direction YJ1, but the recording control unit 50B prohibits ejecting ink at the trailing end 4e of the check 4 and ends the recording process. The operation selection unit 50C then selects the secondary pocket 9b as the destination for the check 4 because recording to the check 4 failed. The operation selection unit 50C otherwise determines that recording on the check 4 succeeded and selects the main pocket 9a as the discharge pocket for the check 4. Note that the length of the check 4 in the conveyance direction YJ1 can be calculated by the size detection unit 50E based on output from the paper length detector 27 while the check 4 is conveyed.

As described below, the success or failure of the recording process can also be determined and the next operation can be determined by the operation selection unit 50C using the intermediate detector 32.

The leading end 4d of the conveyed check 4 is detected by the intermediate detector 32 disposed upstream from the recording head 33, and the check 4 is then conveyed a specific distance. The printing process applied to the check 4 conveyed the specific distance is started by the recording head 33. Recording on the check 4 and conveyance then proceed, and when the check 4 has been conveyed the specific distance after the trailing end 4e of the check 4 is detected by the intermediate detector 32, the recording control unit 50B ends the printing process on the check 4. If there is any image data for which the recording process has not been completed (that has not been recorded on the check 4) when the printing process ends, the operation selection unit 50C determines that recording on the check 4 failed and selects the secondary pocket 9b as the destination for the check 4. However, if there is no image data that has not been recorded, the operation selection unit 50C determines that recording succeeded, and selects the main pocket 9a as the discharge destination for the check 4. The specific distance that is used here is the length of the conveyance path W between the intermediate detector 32 and recording head 33. In addition, if the recording area of the check 4 is previously determined, the specific distance conveyed after the leading end 4d of the check 4 is detected is the length of the conveyance path W between the intermediate detector 32 and recording head 33 plus the length from the leading end 4d of the check 4 to the leading end of the recording area, and the specific distance conveyed after the trailing end 4e of the check 4 is detected is the length of the conveyance path W between the intermediate detector 32 and recording head 33 minus the length from the trailing end 4e of the check 4 to the trailing end of the recording area.

First Embodiment of a Reading Process

Figure 7A:
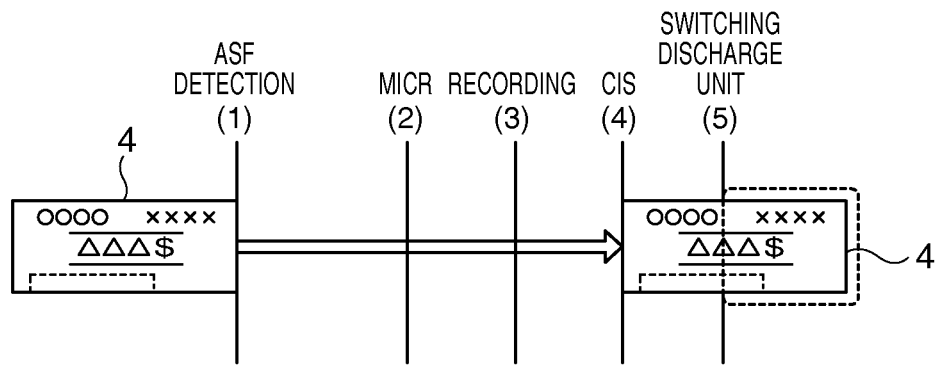
FIG. 7A schematically describes conveyance of a check in a first embodiment of a reading process.
Figure 7B:
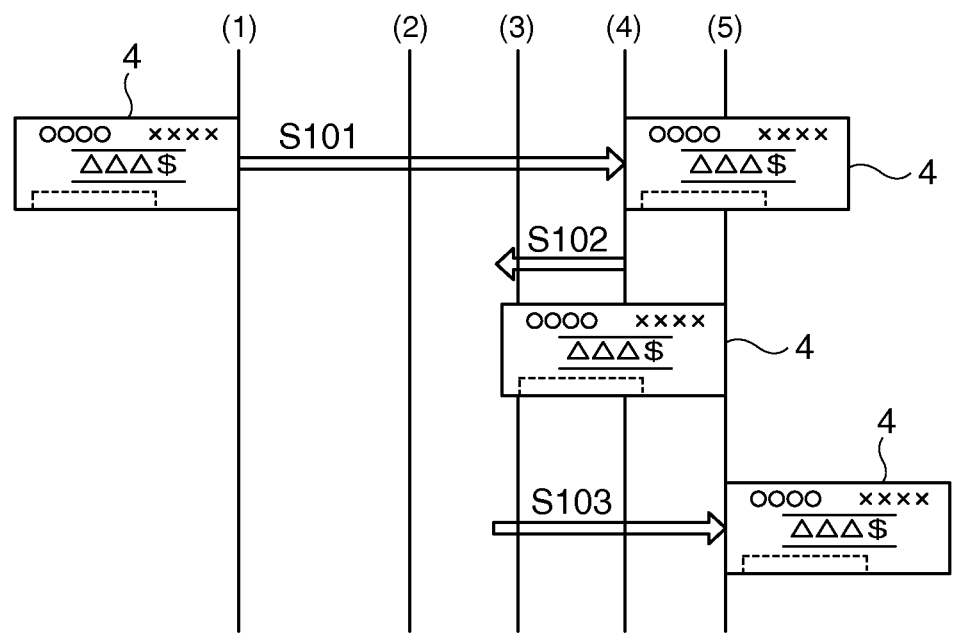
FIG. 7B schematically describes conveyance of a check in a first embodiment of a reading process.

FIG. 7A and FIG. 7B schematically describe conveyance of a check 4, FIG. 7A showing when optically reading a check 4 is completed, and FIG. 7B showing the change in conveyance until the check 4 is discharged.

The horizontal axis shows the position on the conveyance path W in FIG. 7A and FIG. 7B. Positions (1) to (5) in the figures indicate specific process positions along the conveyance path W. More specifically, position (1) is the position where the ASF paper detector 16 detects a check 4; position (2) is the reading position where the MICR head 23 reads magnetically; position (3) is the recording position where the recording head 33 ejects ink and records; position (4) is the scanning position where the front CIS unit 41 and back CIS unit 43 read optically; and position (5) is the switching position of the diversion gate 45.

A check 4 is first detected by the ASF paper detector 16, and then fed into the conveyance path W by the pickup roller 17. The check 4 is then conveyed past positions (2) to (4) by the drive power of the conveyance motor 63, and is guided into the main pocket 9a or secondary pocket 9b by the diversion gate 45 at position (5). However, if the distance between process positions on the conveyance path W is shorter than the length of the check 4 in the conveyance direction, the check 4 will reach the process position on the downstream side while in the middle of an upstream process. If the upstream process is the scanning process of the front CIS unit 41 and back CIS unit 43, the check 4 will be past position (5) when the front CIS unit 41 and back CIS unit 43 finish scanning as shown in FIG. 7A. In FIG. 7A, when the trailing end of the check 4 in the conveyance direction is at position (4), the leading end of the check 4 (the part enclosed in a dotted line in the figure) is already past position (5). In this situation the discharge path of the check 4 cannot be changed even if the diversion gate 45 is moved.

The distance between position (4), which is the optical scanning position, and position (5), which is the process position for changing the pocket into which the check is discharged, is the problem in the example shown in FIG. 7A, but the same problem can occur at other process positions. For example, when reading the check 4 magnetically is completed, the trailing end of the check 4 is at position (2) and the leading end of the check 4 may already be at position (4). As a result, even if whether or not to proceed with optical scanning is determined according to the results of magnetic reading, the part that has already passed position (4) cannot be read.

This embodiment of the invention therefore enables processing checks 4 in a specific order even if the distance between process positions is short by temporarily conveying the check 4 in reverse (back-feeding) as controlled by the conveyance control unit 50A.

As shown in FIG. 7B, the conveyance control unit 50A conveys the check 4 forward (downstream) until optically scanning the check 4 is completed (S101). The conveyance control unit 50A then back-feeds the check 4 temporarily so that the check 4 discharge path can be changed by the diversion gate 45 (S102). The conveyance control unit 50A back-feeds the check 4 at least until the leading end of the check 4 is at position (5) or is upstream of position (5). After the diversion gate 45 is moved by the process control unit 50D, the conveyance control unit 50A conveys the check 4 forward, that is, to the exit pocket 9 (S103). As a result, the pocket into which the check 4 is discharged can be changed by the diversion gate 45 after the optical reading process ends at position (4).

The distance that the conveyance control unit 50A back-feeds the check 4 is determined from the size of the check 4 that can be processed by the media processing device 1 (the length in the conveyance direction), and the distance between the process positions on the conveyance path W. This back-feed distance is, for example, a specific amount that is preset and is stored in nonvolatile memory (not shown in the figure) of the control unit 50. In this case, the back-feed distance is set referenced to the maximum size of a check 4 that can be used in the media processing device 1, and is set to the distance the leading end of the check 4 travels to reach the process position or the upstream side of the process position when a check 4 of the maximum size is used and back-fed. More specifically, the back-feed distance is determined from the maximum size (length) of the checks 4, and the distance between position (2) and position (5) or the distance between position (4) and position (5).

If the back-feed operation is performed before reading with the front CIS unit 41 and back CIS unit 43, for example, and not only when the check 4 passes the diversion gate 45, the distance between position (2) and position (4) is also used as a factor in determining the back-feed distance. When a plurality of back-feed distances are determined, the greatest back-feed distance may be used or different back-feed distances may be used according to the position of the check 4.

Referring again to FIG. 3, the scanning control unit 50F controls the reading control circuit 57 and magnetically reads the MICR line 4A with the MICR head 23. The scanning control unit 50F sends the output data from the MICR head 23 input from the reading control circuit 57 through the interface unit 59 to the host computer 5. The host computer 5 then interprets the data received from the media processing device 1 to recognize the MICR line 4A, and sends the recognition result, that is, data indicating whether recognition of the MICR line 4A succeeded or failed, to the media processing device 1. Based on the recognition result received from the host computer 5 through the interface unit 59, the scanning control unit 50F recognizes if magnetic reading succeeded or failed.

The scanning control unit 50F drives the front CIS unit 41 and back CIS unit 43 through the reading control circuit 57 to optically read the front 4a and back 4b of the check 4. The scanning control unit 50F sequentially stores the scanned image data of the front CIS unit 41 and back CIS unit 43 to the buffer memory 54, and reads and sends the image data stored in the buffer memory 54 in specific byte units through the interface unit 59 to the host computer 5. The host computer 5 then receives the scanned image data sent from the media processing device 1.

If recognition of the MICR line 4A was determined to have failed, the scanning control unit 50F acquires the information in the MICR line 4A from the host computer 5 by applying optical character recognition (OCR) to the image data captured by the front CIS unit 41. In this case, the scanning control unit 50F also sends control data requesting an OCR process when sending the image data from the front CIS unit 41 to the host computer 5. In response to this request, the host computer 5 applies an OCR process to the received image data, and sends data indicating the recognition result to the media processing device 1. The scanning control unit 50F receives the recognition result from the host computer 5, and determines if OCR succeeded or failed.

Based on whether or not the scanning control unit 50F succeeded in reading the MICR line 4A, the operation selection unit 50C determines the content of the operation to be performed on the check 4. More specifically, if the scanning control unit 50F succeeded in reading and recognizing the MICR line 4A with the MICR head 23, the operation selection unit 50C determines the content of the operation on the check 4 to be scanning with the front CIS unit 41 and back CIS unit 43 and discharging to the main pocket 9a. If the scanning control unit 50F failed in reading and recognizing the MICR line 4A with the MICR head 23, the content of the operation on the check 4 is OCR based on the image data captured by the front CIS unit 41. In addition, if recognizing the MICR line 4A with the OCR process fails, the content of the operation on the check 4 is discharge to the secondary pocket 9b.

The process control unit 50D controls the execution of the operation on the check 4 selected by the operation selection unit 50C. More specifically, if the selected operation is discharging the check 4 into the main pocket 9a or the secondary pocket 9b, the process control unit 50D drives the diversion gate drive unit 61 to move the diversion gate 45 to connect the pocket on the selected side to the conveyance path W.

If the selected operation is an OCR process based on the image data captured by the front CIS unit 41, the process control unit 50D executes the OCR process after the scanning process. The process units controlled by the process control unit 50D in this case include the diversion gate 45 and diversion gate drive unit 61. The front CIS unit 41 and back CIS unit 43 and the reading control circuit 57 that controls them also function as process units.

The size detection unit 50E receives the output value of the paper length detector 27 from the sensor drive circuit 58, and detects the size of the check 4 in the long direction, that is, the conveyance direction, based on the conveyance amount of the conveyance motor 63 between when the paper length detector 27 detects the leading end and detects the trailing end of the check 4.

Figure 8:
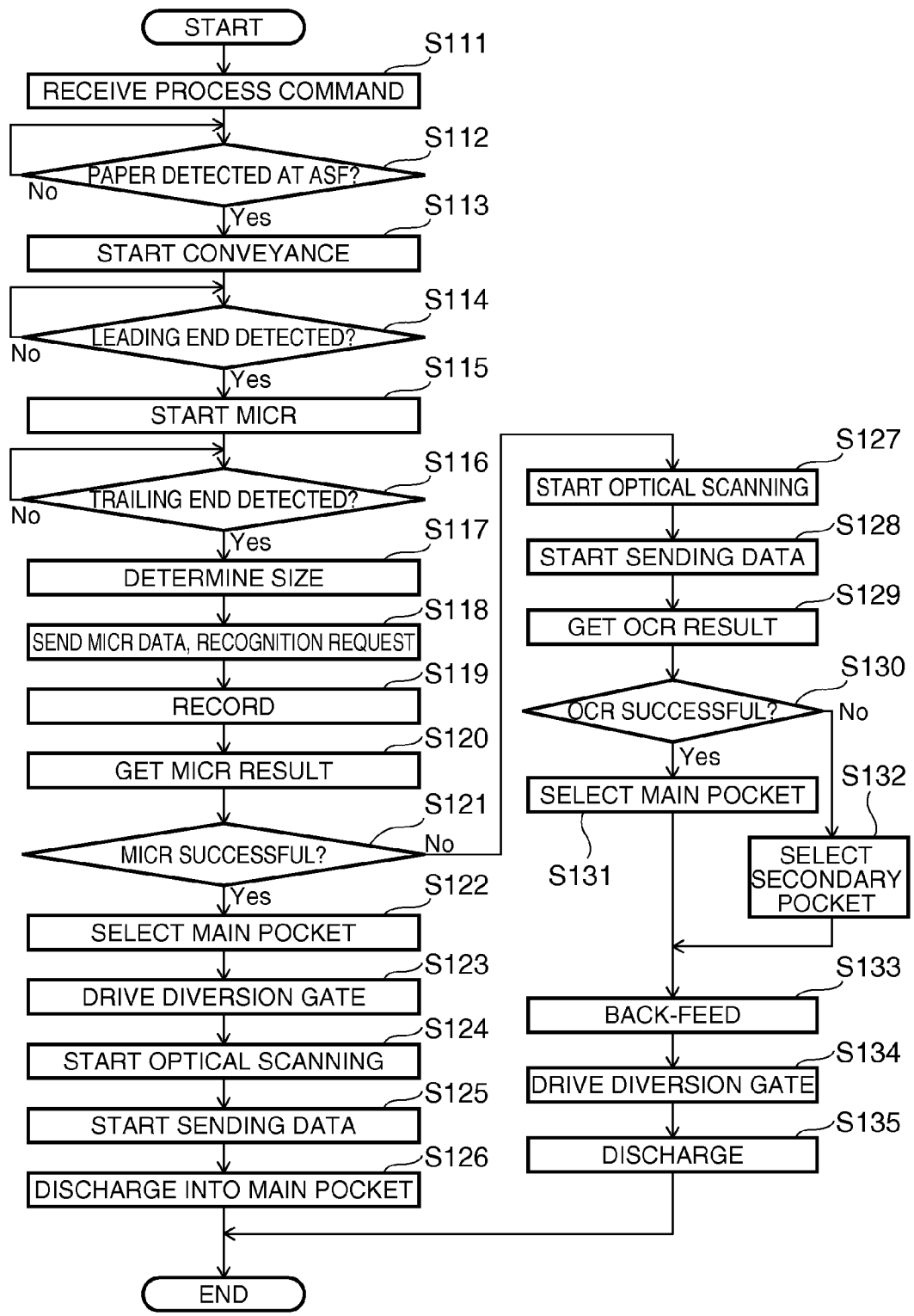
FIG. 8 is a flow chart of the operation of the media processing device in a first embodiment of a reading process.

FIG. 8 is a flow chart of the operation of the media processing device 1.

The control unit 50 receives a command sent from the host computer 5 to start processing a check 4 (step S111), and starts the process. The control unit 50 then determines based on the output from the ASF paper detector 16 whether a check 4 is in the hopper 7 (step S112), and if a check 4 is not present (step S112 returns No), waits until a check 4 is loaded. If a check 4 is in the hopper 7 (step S112 returns Yes), the conveyance control unit 50A operates the pusher drive unit 15 and ASF motor 62, and starts supplying (conveying) a check 4 from the hopper 7 (step S113). The conveyance control unit 50A conveys the check 4 to the paper length detector 27 by the ASF roller set 19 and assist rollers 21 (step S114), and when the leading end of the check 4 is detected (step S114 returns Yes), the size detection unit 50E starts detecting the size and the scanning control unit 50F starts reading the MICR line with the MICR head 23 (step S115).

The size detection unit 50E waits until the trailing end of the check 4 is detected by the paper length detector 27 (step S116), and when the trailing end of the check 4 is detected (step S116 returns Yes), determines the size of the check 4 (step S117).

The scanning control unit 50F then captures and sends the output from the MICR head 23 through the interface unit 59 to the host computer 5, and causes the host computer 5 to interpret the MICR text (step S118). The control unit 50 then causes the recording head 33 to record on the check 4 (step S119).

The scanning control unit 50F then receives control data sent from the host computer 5 (step S120), and recognizes if the reading the MICR line 4A with the MICR head 23 succeeded or not based on the control data content (step S121).

If the reading of the MICR line 4A succeeded (step S121 returns Yes), the operation selection unit 50C sets the discharge destination of the check 4 to the main pocket 9a (step S122). More specifically, the operation on the check 4 is determined to be conveyance to the main pocket 9a. As determined by the operation selection unit 50C, the process control unit 50D then controls the diversion gate drive unit 61 to move the diversion gate 45 to the main pocket 9a side (step S123). During this time the conveyance control unit 50A could continue conveying the check 4, or stop check 4 conveyance until the diversion gate 45 finishes moving.

The scanning control unit 50F then starts scanning (optically reading) with the front CIS unit 41 and back CIS unit 43 (step S124), stores the scanned data in the buffer memory 54, and relays the image data stored in the buffer memory 54 to the host computer 5 (step S125). When scanning ends, the conveyance control unit 50A discharges the check 4 into the exit pocket 9, and the check 4 is discharged along the diversion gate 45 into the main pocket 9a.

If reading the MICR line 4A failed (step S121 returns No), the operation selection unit 50C determines that optical character recognition of the MICR line 4A should be performed. The scanning control unit 50F therefore starts scanning with the front CIS unit 41 and back CIS unit 43 as determined by the operation selection unit 50C (step S127), and starts sending the scanned image data to the host computer 5 (step S128).

Note that if the leading end of the check 4 is already at the reading position of the front CIS unit 41 and back CIS unit 43 when the trailing end of the check 4 passes the reading position of the MICR head 23, the conveyance control unit 50A could cause the check 4 to be back-fed before scanning starts in step S127.

The scanning control unit 50F receives control data sent from the host computer 5 indicating the success or failure of the OCR process (step S129), and recognizes if the OCR process succeeded in recognizing the MICR line 4A (step S130). If recognizing of the MICR line 4A succeeded (step S130 returns Yes), the operation selection unit 50C sets the discharge pocket for the check 4 to the main pocket 9a (step S131). More specifically, the content of the operation on the check 4 is determined to be discharge into the main pocket 9a. If recognizing of the MICR line 4A failed (step S130 returns No), the operation selection unit 50C sets the discharge pocket for the check 4 to be the secondary pocket 9b (step S132). More specifically, operation on the check 4 is determined to be discharge into the secondary pocket 9b.

The process control unit 50D then back-feeds the check 4 with the conveyance control unit 50A in order to move the diversion gate 45 according to the operation selected in step S131 or S132 (step S133). Next, the process control unit 50D moves the diversion gate 45 as determined in step S131 or S132 (step S134), and the conveyance control unit 50A conveys the check 4 to the exit pocket 9. As a result, the check 4 is discharged into the main pocket 9a if MICR line 4A recognition succeeded, and is discharged into the secondary pocket 9b if recognition failed.

As a result, when the MICR line 4A on the check 4 is recognized, the check 4 is discharged into the main pocket 9a as a normal check 4, and when the MICR line 4A could not be recognized, is discharged into the secondary pocket 9b as a check 4 that was not processed normally. In other words, the check 4 is discharged selectively to the main pocket 9a or secondary pocket 9b based on the result of recognizing the MICR line 4A.

As described above, a media processing device 1 related to a first embodiment of a reading process according the invention, and a media processing system 10 using the media processing device 1, have a conveyance unit that conveys a check 4 as a process medium and includes a pusher drive unit 15, ASF motor 62, conveyance motor 63, pickup roller 17, ASF roller set 19, MICR roller 25, conveyance roller 31, and discharge roller 47; an MICR head 23 or front CIS unit 41 and back CIS unit 43 as a reading unit that is disposed in the check 4 conveyance path W and reads information recorded on a conveyed check 4; a diversion gate drive unit 61 or front CIS unit 41 and back CIS unit 43 as a process unit disposed downstream from the reading unit on the check 4 conveyance path W; a process control unit 50D that controls processing checks 4 by the foregoing process units according to the content of the operation to be performed after reading as determined by the operation selection unit 50C based on the reading result; and a conveyance control unit 50A that conveys the check 4 to the upstream side to the process position or the upstream side of the process position after the content of the operation to be performed after reading is determined. When the operation to be performed next is determined according to the result of reading the MICR line 4A recorded on the check 4 and that process is executed, the process can be executed from the normal processing position even if the check 4 already reached the printing position before the process starts due to the relationship between the length of the conveyance path W and the process positions of each unit by temporarily conveying the check 4 upstream. The media processing device 1 can therefore be built compactly because limitations related to the length of the conveyance path and the relative positions of different process unit can be alleviated.

The diversion gate 45 used as one process unit can be disposed in a position where the leading end of the check 4 will be downstream from the process position of the diversion gate 45 when the MICR head 23 finishes reading the check 4, and the device can be formed even more compactly. The media processing device 1 also has a main pocket 9a and secondary pocket 9b as a plurality of discharge units into which the checks 4 are discharged, and can change the discharge unit into which the check 4 is discharged according to the reading result by discharging the check 4 to the pocket on the side determined by the operation selection unit 50C as a result of the operation selection unit 50C selecting the main pocket 9a or the secondary pocket 9b as the discharge unit based on the result of reading by a reading unit, and the process control unit 50D operating the diversion gate 45 accordingly.

Furthermore, by providing an operation selection unit 50C, the content of the operation performed after reading ends can be quickly determined based on the result of reading by the MICR head 23 or by the front CIS unit 41 and back CIS unit 43.

Furthermore, because an MICR head 23 that reads the MICR line 4A recorded on checks 4, and a front CIS unit 41 and back CIS unit 43, are used as reading units, and the operation selection unit 50C determines the next operation based on the result of recognizing the information read by the MICR head 23, and the recognition result of an OCR process using the front CIS unit 41 and back CIS unit 43, the operation to be performed on the check 4 can be controlled more precisely, and checks 4 can be processed more appropriately and effectively.

Second Embodiment of a Reading Process

Figure 9:
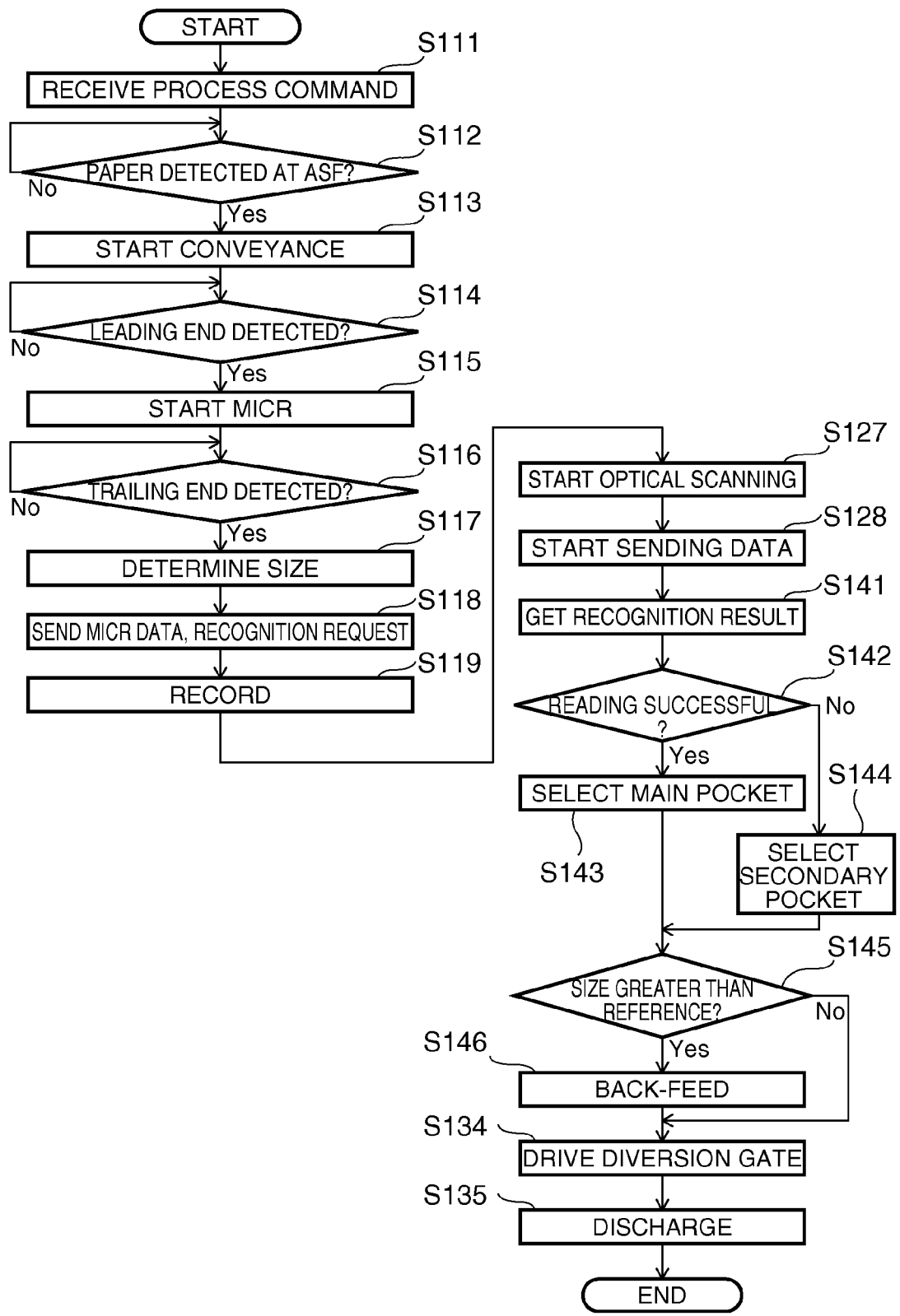
FIG. 9 is a flow chart of the operation of the media processing device in a second embodiment of a reading process.

FIG. 9 is a flow chart of the operation of a media processing system 10 related to a second embodiment of a reading process according to the invention. In this second embodiment of a reading process, parts that are the same as in the media processing system 10 according to the first embodiment of a reading process described above are identified by like reference numerals, and further description thereof is omitted.

The operation shown in FIG. 9 is executed instead of the operation shown in FIG. 8. Note that steps performing the same operation as in FIG. 8 are identified by the same step numbers in FIG. 9.

The control unit 50 first executes steps S111 to S119 as described in the above first embodiment. After recording with the recording head 33 in step S119, the scanning control unit 50F starts scanning with the front CIS unit 41 and back CIS unit 43 (step S127), and starts sending the scanned image data through the interface unit 59 to the host computer 5 (step S128).

The scanning control unit 50F then receives through the interface unit 59 control data sent from the host computer 5 indicating whether recognition of the MICR line 4A by the MICR head 23 succeeded (step S141), and based on this control data recognizes whether or not recognizing the MICR line 4A succeeded (step S142). If recognizing the MICR line 4A succeeded (step S142 returns Yes), the operation selection unit 50C sets the discharge pocket for the check 4 to the main pocket 9a (step S143). More specifically, the content of the operation on the check 4 is determined to be discharge into the main pocket 9a. If recognizing the MICR line 4A failed (step S142 returns No), the operation selection unit 50C sets the discharge pocket for the check 4 to the secondary pocket 9b (step S144). More specifically, the content of the operation on the check 4 is determined to be discharge into the secondary pocket 9b.

The operation selection unit 50C then acquires the size of the check 4 determined in step S117, and determines if this size is greater than or equal to a preset reference length (step S145). As shown in FIG. 7A and FIG. 7B, this reference length is equal to the maximum check 4 length at which the leading end of the check 4 will not reach the process position (5) of the diversion gate 45 when the trailing end of the check 4 passes the scanning position (4). This reference length is preset by an operation of the media processing device 1 or the host computer 5, and is stored in nonvolatile memory (not shown in the figure) of the control unit 50.

If the size of the check 4 is greater than or equal to the reference length (step S145 returns Yes), the process control unit 50D back-feeds the check 4 by means of the conveyance control unit 50A (step S146). Next, the process control unit 50D moves the diversion gate 45 as determined in step S143 or S144 (step S134), and the conveyance control unit 50A conveys the check 4 to the exit pocket 9.

If the size of the check 4 is smaller than the reference length (step S145 returns No), the process control unit 50D goes to step S134 and moves the diversion gate 45 without back-feeding the check 4. As a result, the check 4 is discharged into the pocket on the side determined by the operation selection unit 50C when the check 4 is conveyed to the exit pocket 9 by the conveyance control unit 50A.

The media processing device 1 related to this second embodiment of a reading process determines whether or not to back-feed based on the size of the check 4, and back-feeds only when necessary. More specifically, if the size of the check 4 is greater than or equal to a specific size, the distance between process positions on the conveyance path W will be shorter than the size of the check 4 and back-feeding is necessary, and the check 4 is therefore back-fed before moving the diversion gate 45. This is useful for reducing the number of times back-feeding is required when the size of the check is small relative to the sizes of checks 4 that can be processed by the media processing device 1 and sufficient distance can be assured between process positions on the conveyance path W.

The foregoing embodiments describe specific examples of preferred embodiments of the invention, but the invention is not limited thereto. For example, the process media that are processed by the media processing device 1 in this media processing system 10 are not limited to checks 4, and the size of the process media that can be used in the media processing device 1 can be changed as desired.

In addition, the foregoing embodiments are described with the media processing device 1 having an operation selection unit 50C that determines the content of the operation applied to the check 4 based on whether or not the control unit 50 succeeded in recording on the check 4, but this function can be performed by the host computer 5 operating according to a specific program.

The foregoing embodiments are described with the media processing device 1 having an operation selection unit 50C that determines the content of the operation applied to the check 4 based on whether or not the scanning control unit 50F succeeded in reading the MICR line 4A, but this function can be performed by the host computer 5 operating according to a specific program.

The foregoing embodiments are also described with the host computer 5 interpreting the MICR line 4A based on data read by the MICR head 23, and executing an OCR process based on the image data captured by the front CIS unit 41 and back CIS unit 43, but these processes can be performed by the control unit 50.

Comparing the length of the image represented by the image data (image length) and the length of the check 4 detected by the paper length detector 27 can also be done by the host computer 5 or by the control unit 50.

Further alternatively, a configuration that has the host computer 5 and media processing device 1 combined in the same device, and also uses the control unit 50 as the control unit of the host computer 5, is also within the scope of the present invention.

The exit pocket 9 is also not limited to having two pockets, a main pocket 9*a* and a secondary pocket 9*b*, and could be divided into more pockets. Yet further, if the operation determined by the operation selection unit 50C does not include switching between the main pocket 9*a* and secondary pocket 9*b*, the exit pocket 9 could have only one pocket.

The function units shown in the block diagram in FIG. 3 simply indicate functional components, the individual functional units need not be separate hardware components, and the functions of plural functional units may be combined into a single hardware component, or a single functional unit could be achieved by plural hardware components, through cooperation between software and hardware.

The recording unit of the media processing device 1 is also not limited to a configuration using an inkjet recording head 33, and a thermal line printer, dot impact printer, laser printer, dye sublimation printer, or other type of printer could be used.

The invention is also not limited to a configuration that stores the program executed by the CPU of the control unit 50 that performs the operations described above in nonvolatile memory that is part of the control unit 50, and configurations that store the program on a removable recording medium, configurations that store the program downloadably to another device connected over a communication line so that the media processing device 1 can download and execute the program from the other device, and other configurations are also within the scope of the present invention.

What is claimed is:

1. A media processing device comprising:
a conveyance unit that conveys a process medium;
a first process unit that is disposed in a conveyance path through which the process medium is conveyed and processes the process medium;
a second process unit that is disposed downstream from the first process unit in the conveyance path through which the process medium is conveyed;
a process control unit that causes the second process unit to process the process medium according to operating content determined according to a result of processing by the first process unit; and
a conveyance control unit that conveys the process medium upstream to a process position of the second process unit or an upstream side of the process position of the second process unit after the operating content is determined according to the result of processing by the first process unit and before the process medium being conveyed downstream is processed by the second process unit.

2. The media processing device described in claim 1, wherein:
the second process unit is disposed such that the process medium reaches a position downstream from the process position of the second process unit when the first process unit has finished processing the process medium.

3. The media processing device described in claim 1, further comprising:
an operation selection unit that determines the operating content after processing by the first process unit based on the result of processing by the first process unit.

4. The media processing device described in claim 1, further comprising:
a plurality of discharge units into which process media are discharged;
wherein the second process unit is configured as a switching unit that switches the discharge unit connected to the conveyance path of the process medium, and
the process control unit operates the switching unit so that the process medium is discharged to one of the plural discharge units selected based on the result of processing by the first process unit.

5. The media processing device described in claim 1, wherein:
the first process unit is a recording unit that records an image on the process medium.

6. The media processing device described in claim 1, wherein:
the first process unit is a reading unit that reads information recorded on the process medium.

7. The media processing device described in claim 1, wherein:
the first process unit is a reading unit that reads information magnetically recorded on the process medium.

8. The media processing device described in claim 1, wherein:
the first process unit has a plurality of reading units that read information recorded on the process medium; and
the operating content is determined based on reading results of the plural reading units.

9. A check processing device comprising:
a conveyance unit that conveys a check;
a first process unit that is disposed in a conveyance path through which the check is conveyed and processes the check conveyed by the conveyance unit;
a second process unit that is disposed downstream from the first process unit on the conveyance path through which the check is conveyed;
a process control unit that causes the second process unit to process the check according to operating content determined according to a result of processing by the first process unit; and
a conveyance control unit that conveys the check upstream by the conveyance unit to a process position of the second process unit or an upstream side of the process position of the second process unit after the operating content is determined according to the result of processing by the first process unit and before the check being conveyed downstream is processed by the second process unit.

10. The check processing device described in claim 9, wherein:
the second process unit is disposed such that the check reaches a position downstream from the process position of the second process unit when the first process unit has finished processing the check.

11. The check processing device described in claim 9, wherein:
an operation selection unit that determines the operating content after processing by the first process unit based on the result of processing by the first process unit.

12. The check processing device described in claim 9, further comprising:
a plurality of discharge units into which checks are discharged;
wherein the second process unit is configured as a switching unit that switches a discharge unit connected to the conveyance path of the check, and
the process control unit operates the switching unit so that the check is discharged to one of the plurality of discharge units selected based on the result of processing by the first process unit.

13. The check processing device described in claim 9, wherein:
the first process unit is a recording unit that records an image on the check.

14. The check processing device described in claim 9, wherein:
the first process unit is a reading unit that reads information recorded on the check.

15. The check processing device described in claim 9, wherein:
the first process unit is a reading unit that reads information magnetically recorded on the check.

16. The check processing device described in claim 9, wherein:
the first process unit has a plurality of reading units that read information recorded on the check; and
the operating content is determined based on the reading results of the plural reading units.

17. A control method for a media processing device, comprising steps of:
conveying a process medium and processing the conveyed process medium by a first process unit disposed in a conveyance path;
determining content of an operation after processing based on a result of processing by the first process unit;
processing the process medium by a second process unit disposed downstream from the first process unit according to the content of the determined operation; and
conveying the process medium upstream to a process position of the second process unit or an upstream side of the process position of the second process unit after determining the operating content and before the process medium being conveyed downstream is processed by the second process unit.

18. The control method for a media processing device described in claim 17, further comprising steps of:
determining a discharge unit for discharging the process medium from among a plurality of discharge units based on the result of processing by the first process unit; and
operating the second process unit so that the process medium is discharged into the determined discharge unit.

19. The control method for a media processing device described in claim 17, wherein:
the processing of the first process unit comprises reading information recorded on the process medium.

20. The control method for a media processing device described in claim 17, wherein:
the processing of the first process unit comprises reading information magnetically recorded on the process medium.

\* \* \* \* \*